United States Patent
[11] 3,627,336

| [72] | Inventor | Gordon C. Lawson<br>4693 Canoga St., Montclair, Calif. 91763 |
| [21] | Appl. No. | 649,175 |
| [22] | Filed | June 27, 1967 |
| [45] | Patented | Dec. 14, 1971 |

[54] EXTRUSION RESISTANT PRESSURE RING ASSEMBLY FOR SLIDABLY TELESCOPING MEMBERS
4 Claims, 7 Drawing Figs.

[52] U.S. Cl. .................................................. 277/188,
277/177, 277/203, 72/61
[51] Int. Cl. ...................................................... F16j 15/00,
F16j 9/00
[50] Field of Search ........................................... 277/188,
203, 177, 116.2; 72/61

[56] References Cited
UNITED STATES PATENTS

| 1,130,615 | 3/1915 | Laursen ........................ | 277/203 X |
| 2,446,224 | 8/1948 | Frisby et al. ..................... | 277/188 |
| 2,458,854 | 1/1949 | Hull et al. ....................... | 72/58 |
| 2,462,586 | 2/1949 | Whittingham ................. | 277/188 |
| 2,809,080 | 10/1957 | Mittell et al. ................... | 277/188 X |
| 3,316,940 | 5/1967 | Gratzmuller ................... | 138/31 |
| 3,362,720 | 1/1968 | Henry et al. .................... | 277/188 X |
| 484,188 | 10/1892 | Ethridge ......................... | 277/203 |
| 2,921,632 | 1/1960 | Clark, Jr. ........................ | 277/116.2 |

*Primary Examiner*—Samuel B. Rothberg
*Attorney*—Jessup and Beecher

ABSTRACT: A pressure ring assembly to be installed between slidably telescoping members, the assembly having a resilient pressure ring which is compressed axially and thereby expanded radially into pressured contact with the members, and helical antiextrusion backup rings at the ends of the pressure ring which expand radially to prevent extrusion of the pressure ring between the members.

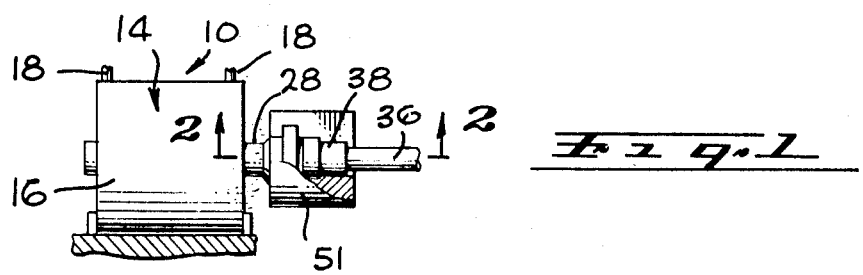
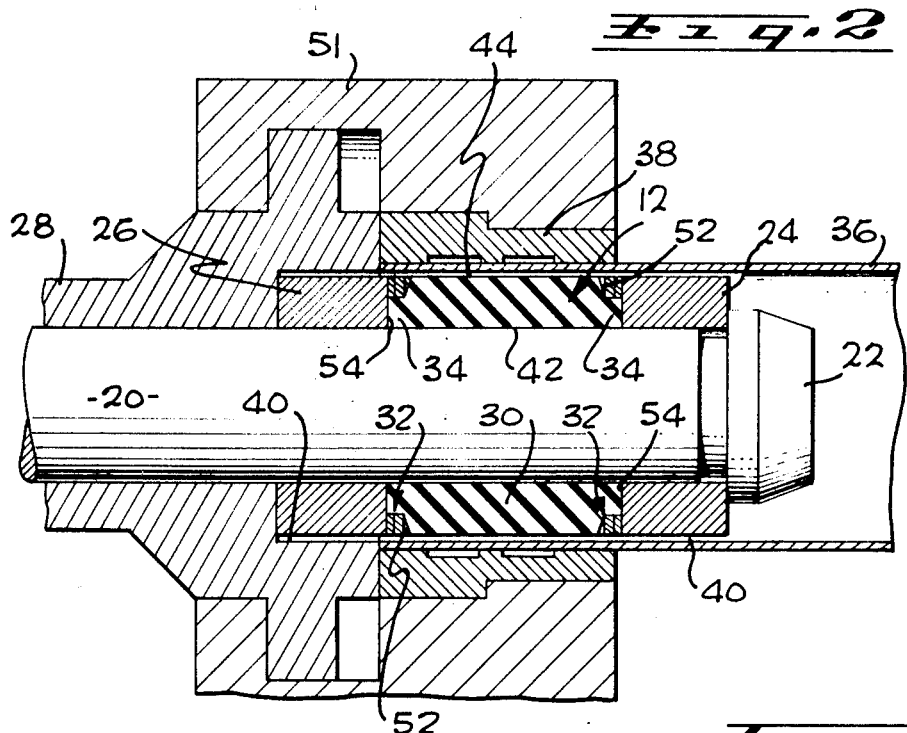
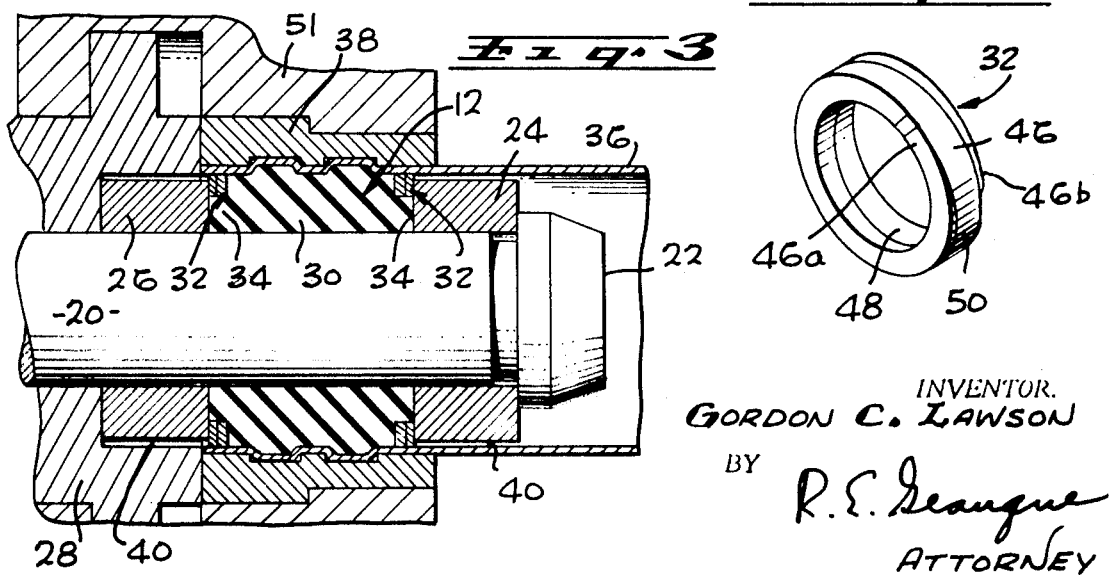
INVENTOR.
GORDON C. LAWSON

GORDON C. LAWSON
INVENTOR.

BY R. E. Geangue
ATTORNEY

3,627,336

EXTRUSION RESISTANT PRESSURE RING ASSEMBLY FOR SLIDABLY TELESCOPING MEMBERS

This invention relates generally to a pressure ring assembly for use with slidably telescoping members, which ring assembly is axially compressible to radially deform a resilient pressure ring embodied in the assembly into pressured contact with the telescoping members. More particularly, the invention relates to a pressure ring assembly of the character described including unique antiextrusion backup rings for preventing extrusion of the pressure ring between the telescoping members.

Stated broadly, the present invention is concerned with the problem of inhibiting or preventing extrusion of a resilient pressure ring, disposed between slidably telescoping members, into an annular clearance spaced between the members. It will be immediately recognized that this problem exists in a variety of mechanical devices. As will appear from the ensuing description, the extrusion resistant pressure ring assembly of the present invention may be employed in many, if not all, of these devices to prevent such pressure ring extrusion. While the applications of the present pressure ring assembly are many and varied, only three of these applications will be discussed herein. Accordingly, it should be understood at the outset that the disclosed applications of the invention are intended to be illustrative rather than limiting in nature.

One type of device in which the problem of pressure ring extrusion is encountered, for example, is a tube-swaging device for internally pressurizing a tube to deform or swage the tube outwardly into interlocking engagement with a surrounding coupling part. A typical tube-swaging device of this kind has a drawbolt which is driven axially by a hydraulic ram. Mounted on the draw bolt, between outer and inner sizing bushings on the bolt, is a resilient axially compressible and radially expandable tube expander ring or sleeve. This expander sleeve is typically constructed of an elastomer or other suitable resilient material. When the ram is pressurized to drive or retract the drawbolt toward the ram cylinder, the outer bushing moves with the drawbolt, while the inner bushing is retained stationary by the ram cylinder. The resilient expander sleeve is thus compressed axially between the bushings and is thereby radially deformed or expanded.

In use of this tube-swaging device, the drawbolt, together with its sizing bushings and expander sleeve, is inserted axially into one end of a tube encircled by an internally grooved coupling part. The drawbolt is then retracted to axially compress the tube expander sleeve and thereby expand this sleeve radially outward against the tube. This radial expansion of the sleeve internally pressurizes the tube and deforms or swages the tube outwardly into interlocking fluid tight engagement with its surrounding coupling part.

One of the major difficulties encountered with a swaging device of this kind resides in the fact that the material of the resilient tube expander sleeve tends to extrude axially into the annular clearance spaced between the sizing bushings and the tube being swaged. This extrusion problem is compounded when the swaging device is employed to swage tubes of various internal diameters for the reason that the annular clearance spaces between the sizing bushings and the largest tube which the device will accept are relatively large.

Various antiextrusion means have been devised to inhibit or prevent such expander sleeve extrusions. One of the existing antiextrusion means, for example, comprise metal or plastic backup rings which are outwardly radially deformed or expanded against the inner surface of the tube to inhibit extrusion of the sleeve between the tubes and rings. However, these antiextrusion rings do not spring back sufficiently to enable their repeated reuse. Another existing antiextrusion means for the purpose described comprise split antiextrusion rings which are also deformed or expanded outwardly against the tube being swaged to resist extrusion of the tube expander sleeve. These split rings, in addition, exhibit sufficient resiliency to return to their original shape when the axial pressure on the tube expander sleeve is relieved. Accordingly, the split extrusion rings are capable of reuse. However, such split extrusion rings are deficient for the reason that outward deformation or spreading of the rings creates widening gaps between the ring ends through which the expander sleeve tends to extrude. Such extrusion frequently bends the ends of the extrusion rings, thus necessitating their replacement.

A similar extrusion problem exists with resilient seal rings which provide a fluid seal between slidably telescoping members, such as a cylinder and the shaft or piston head of a plunger movable in the cylinder. Thus, in these fluid pressure devices, the seal rings tend to extrude between the inner cylinder wall and the outer surface of the plunger shaft or piston head, as the case may be, particularly during relative axial movement of this cylinder and plunger. Other devices embodying slidably telescoping members and a resilient ring or sleeve which is stressed in such a way that the ring tends to extrude between the members are many and varied.

In all of these devices, extrusion of the resilient ring or sleeve is undesirable for many reasons including the fact that the ring is subject to rapid deterioration and thus must be replaced at frequent intervals. Also, such ring extrusion imposes increased resistance to relative movement of the telescoping members and may cause leakage or other malfunction of, or damage to the device in which the extrusion occurs.

As noted earlier, the extrusion resistant pressure ring assembly of the present invention may be used to advantage in all of the above noted and other devices in which extrusion of a resilient pressure ring sleeve between slidably telescoping members is a problem.

Briefly, the present pressure ring assembly is characterized by a resilient pressure ring or sleeve which is compressed axially and thereby deformed radially by axial compression of the ring assembly, a helical antiextrusion spring backup ring having circumferentially overlapping ends coaxially disposed at one or both ends of the pressure ring, depending upon the particular application of the ring assembly, the pressure ring and backup rings having inner and outer radially presented surfaces and corresponding surfaces of the rings being exposed for sliding contact with one of the telescoping members between which the ring assembly is installed, and means on the ends of the pressure ring for radially deforming the backup rings in the direction of their exposed radially presented surfaces upon axial compression of the ring assembly. The ring assembly is designed for use with slidably telescoping members having confronting, radially presented and spaced cylindrical surfaces defining an intervening annular clearance space bounded by an annular axially presented shoulder face on one member. The ring assembly is installed between the telescoping members in such manner that the ring assembly surrounds the inner telescoping member and is disposed with one backup ring seating axially against the shoulder face on said one member. The exposed radially presented surfaces of the pressure ring and backup rings slidably engage the cylindrical surface of the other member. Axial compression of the ring assembly is then effected to radially deform the pressure ring against both members and the backup rings against the member engaged by the latter rings, thus to prevent axial extrusion of the resilient pressure ring through the annular clearing space between the telescoping members.

The backup-ring-deforming means on the resilient pressure ring comprise axial shoulder extensions on the ends of the pressure ring which extend centrally through or encircle the backup rings, depending upon whether these rings are intended to deform radially inward or outward. These pressure ring extensions are compressed axially and thereby deformed radially against the backup rings, to deform the backup rings radially in or out, as the case may be, upon axial compression of the ring assembly. Preferably, the end faces of the pressure ring body at the inner ends of the pressure ring extensions are beveled or tapered to minimize the axial compressive thrust exerted on the body, during initial radial deformation of the backup rings. This permits the backup rings to deform radially into extrusion inhibiting relation with the inner or outer telescoping member, as the case may be, before any substantial axial compression occurs in the main body of the pressure ring which would tend to extrude the material of the pressure ring between the backup rings and the adjacent telescoping member. These beveled end faces may also create an additional wedging action on the backup rings for aiding initial radial deformation thereof.

It is a general object of the invention, therefore, to provide an extrusion resistant pressure ring assembly for slidably telescoping members.

A more specific object of the invention is to provide an extrusion resistant pressure ring assembly of the character described which embodies novel radially deformable, helical antiextrusion spring backup rings for preventing extrusion of the resilient pressure ring of the assembly between the telescoping members.

Another object of the invention is to provide an extrusion resistant pressure ring assembly of the character described which may be employed for various uses, including a tube expander for a tube-swaging device and a fluid seal between a cylinder and the piston head or shaft of a plunger movable in the cylinder.

A further object of the invention is to provide a novel antiextrusion spring backup ring for a pressure ring assembly of the character described.

Yet a further object of the invention is to provide an extrusion resistant pressure ring assembly of the character described which is relatively simple in construction, economical to manufacture, reliable in use, and otherwise ideally suited to its intended purposes.

Other objects, advantages, and features of the invention will become readily evident as the description proceeds, taken in conjunction with the accompanying drawings, in which:

FIG. 1 is a side elevation, partially in section, of a tube-swaging device embodying a pressure ring or tube expander assembly according to the invention;

FIG. 2 is an enlarged axial section taken on line 2—2 in FIG. 1 illustrating the swaging apparatus at the outset of a swaging cycle;

FIG. 3 is a section similar to FIG. 2 illustrating the swaging apparatus at the conclusion of the swaging cycle;

FIG. 4 is an enlarged perspective view of a spring backup ring according to the invention;

Figure 7:
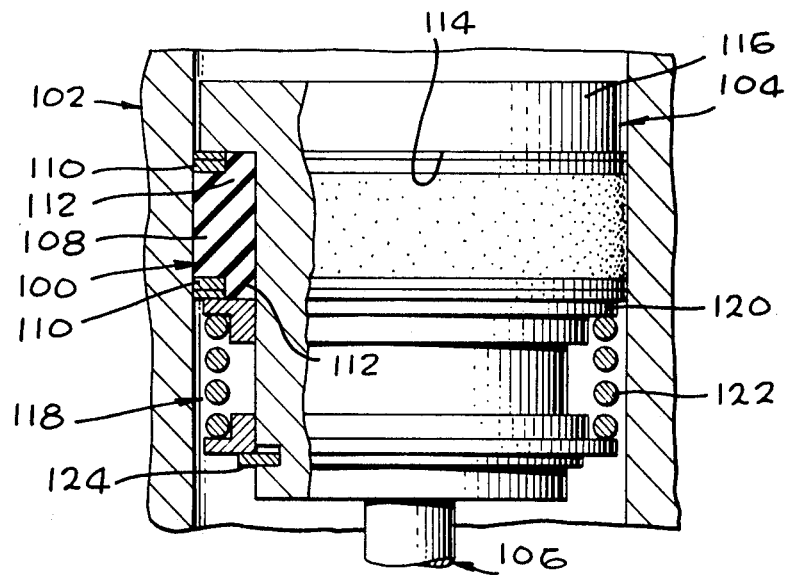
FIG. 7 is an axial section through a dynamic fluid seal embodying a pressure or seal ring assembly according to the invention.

In FIGS. 1–4 of these drawings, there is illustrated a tube-swaging device 10 including an extrusion resistant pressure ring or tube expander assembly 12 according to the invention. The swaging device 10 utilizes a standard actuating cylinder 14 and, accordingly, the swaging device will be described only in such detail as is necessary to a full and complete understanding of the invention. With this in mind, the swaging device comprises a hydraulic ram 14 including a cylinder 16 and a piston (not shown) movable in the cylinder. Hydraulic lines 18 are provided on the cylinder through which the ends of the cylinder may be selectively pressurized and vented, thus to effect movement of the piston in either direction in the cylinder. Fixed to the piston, and extending axially through and beyond one end of the cylinder 16, is a drawbolt 20. On the outer end of this drawbolt is an integral enlarged head or shoulder 22. A pair of sizing bushings 24 and 26 are slidable on the drawbolt inwardly of its shoulder 22. The outer sizing bushing 24 seats axially against the drawbolt shoulder. The inner bushing 26 seats axially against an anvil 28 which surrounds the inner end of the drawbolt and abuts or is secured to the ram cylinder 16.

At the outset of a tube-swaging operation, the drawbolt 20 is extended to its position of FIG. 2. During the swaging operation, the swaging ram 14 is pressurized to retract the drawbolt toward the ram cylinder 16. The outer sizing bushing 24 moves axially with the drawbolt, while the inner sizing bushing is retained stationary by the anvil 28. Accordingly, retraction of the drawbolt is effective to cause relative axial movement of the bushings toward one another.

The present pressure ring or tube expander assembly 12 is mounted on the drawbolt 20, between its sizing bushings 24, 26. As will appear from the ensuing description, the expander assembly is axially compressed, and thereby radially deformed, by relative axial movement of the bushings toward one another. In general terms, the pressure ring or tube expander assembly 12 comprises a resilient pressure ring 30, helical antiextrusion spring backup rings 32 coaxially disposed at the ends of the pressure ring, respectively, and means 34 on the pressure ring for deforming the backup rings radially upon axial compression of the ring assembly.

Briefly, in operation of the tube-swaging device 10, a tube 36 to be swaged to a surrounding coupling part 38 is telescoped over the drawbolt 20, its sizing bushings 24, 26, and the intervening pressure ring or tube expander assembly 12. The swaging ram 14 is then pressurized to retract the drawbolt and thereby axially compress the expander assembly between the bushings. This axial compression of the expander assembly results in axial compression of the pressure ring or tube expander sleeve 30. Such axial compression of the tube expander sleeve deforms the latter radially out against the surrounding tube 36 to swage the tube into interlocking fluid sealing and axial load-carrying engagement with the coupling part 38. During this axial compression of the tube expander sleeve, the backup-ring-deforming means 34 on the sleeve deform the backup ring 32 radially out against the inner surface of the tube to inhibit or prevent extrusion of the sleeve through the annular clearance spaces 40 between the tube and the sizing bushings 24, 26.

Referring now in greater detail to the illustrated tube expander assembly 12, the pressure ring or tube expander sleeve 30 of the assembly comprises a resilient tubular body constructed of an elastomer or other suitable resilient material. Extending through the sleeve is a central opening which receives the drawbolt 20 of the swaging device 10 and defines an inner cylindrical radially presented surface 42 on the sleeve. This surface is exposed for contact with the drawbolt. The expander sleeve has an outer cylindrical radially presented surface 44 which is exposed for contact with the tube 36.

The spring backup rings 32 of the tube expander assembly 12 are identical and each comprises a helically coiled spring wire 46 of rectangular cross section. Each backup ring has at least one coil with circumferentially overlapping ends 46a and 46b. The illustrated backup rings, for example, have two adjacent coils. The side faces of these coils are generally parallel and normal to the ring axis and are disposed in close proximity or in sliding contact with one another. The radially inner and outer surfaces 48, 50 of the spring coils are generally cylindrical and parallel the axis of the backup ring.

As noted earlier and illustrated in the drawings, the backup rings 32 are coaxially disposed at the ends of the tube expander sleeve 30. In the tube swaging application under consideration, the outer radially presented surfaces 50 of the backup rings are exposed for sliding contact with the inner surface of the tube 36, and the ring-deforming means 34 are effective to radially deform or expand the rings outwardly against the tube. The illustrated ring-deforming means 34 comprise axial, axially compressible, radially expandable shoulder extensions integrally formed in the ends of the tube expander sleeve 30. These shoulder extensions extend centrally through and fit closely within the backup rings 32. Preferably, the end faces 52 of the expander sleeve at the inner ends of the sleeve extensions 34 are beveled or tapered, as shown, for the reasons mentioned earlier and hereinafter explained in detail.

When the tube expander assembly 12 is positioned on the drawbolt 20 of the tube-swaging device 10, the expander sleeve 30 surrounds the bolt between its sizing bushings 24, 26, and the backup rings 32 seat axially against the annular, axially presented shoulder faces 54 defined by the bushings. Relative axial movement of the bushings toward one another, upon retraction of the drawbolt in the manner explained earlier, therefore, axially compresses the tube expander sleeve 30. In the normal unstressed condition of the expander assembly, the external diameters of the expander sleeve and backup rings are approximately the same as the external diameter of the sizing bushings. Accordingly, the exposed, outer radially presented surfaces 44, 50 of the expander sleeve and backup rings are substantially flush with the outer bushing surfaces, as shown. When the sleeve is compressed between the bushings, the sleeve deforms or expands radially out against the tube 36 to swage the latter in the manner explained earlier. A work holder 51 surrounds the coupling part 38 to support the latter against radial deformation under the swaging pressure in the tube 36.

In the absence of any antiextrusion means, the material of the tube expander sleeve 30 would extrude axially into the annular clearance spaces 40 between the tube 36 and the bushings 24, 26, both as a consequence of the axial compressive stresses created in the sleeve and the rubbing friction which occurs between the sleeve and the tube in the course of the swaging operation. As explained earlier, this extrusion problem is compounded in swaging devices which are used to swage tubes of various internal diameters within a given tolerance range for the reason that when a tube of larger diameter is swaged, the clearance spaces defined between the sizing bushings and the tube are relatively wide.

The present spring backup rings 32 prevent this extrusion of the tube expander sleeve 30. Thus, during the initial portion of the swaging cycle, the axial pressure of the sizing bushings 24, 26 against the expander sleeve 30 axially compresses the expander sleeve shoulder extensions 34. This axial compression of the extensions causes radial deformation or expansion of these extensions outwardly against the backup rings. The backup rings are thereby expanded radially out against and into pressured contact with the tube 36 to close or seal the clearance spaces 40 and thus prevent extrusion of the expander sleeve into these spaces. During expansion of the backup rings, the adjacent ring coils obviously move or slide circumferentially relative to one another. The backup rings are circumferentially dimensioned so that the ring ends 46a and 46b overlap when the rings are expanded to their maximum diameter. Accordingly, no circumferential gaps are created between the ring ends curing expansion of the backup rings in the course of the swaging cycle through which the material of the expander sleeve 30 might extrude.

Figure 5:
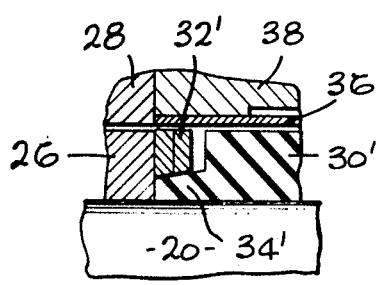
FIG. 5 illustrates a modified pressure ring assembly according to the invention in its normal unstressed condition.
Figure 6:
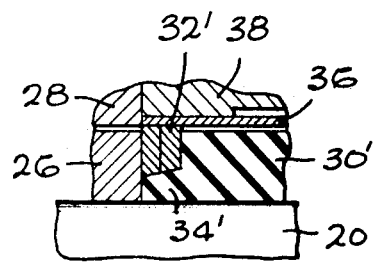
FIG. 6 is a view similar to FIG. 5 illustrating the pressure ring assembly in its axially compressed and radially deformed condition.

Optimum performance of the present tube expander assembly 12 is achieved by radial expansion of the backup rings 32 into extrusion inhibiting relation with the tube 36 prior to any substantial axial compression of the expander sleeve 30 on the axial face of the backup rings 36. It is for this reason that the end faces 52 of the expander sleeve are beveled or tapered, as shown. This permits the shoulder extensions to compress axially, and thereby deform the backup rings radially out against the tube 36, prior to any substantial axial compression of the expander sleeve against the axial faces of the backup rings 36 which would tend to cause extrusion of the sleeve between the tube and backup rings. In some cases, it may be desirable to utilize backup rings 32' which are internally tapered and an expander sleeve 30' with end shoulder extensions 34' which are externally tapered in the manner shown in FIGS. 5 and 6 to permit loading of the backup rings by the resilient material of the expander sleeve in cramped areas and permit the sleeve extensions to exert an outward wedging or camming force on the rings, thus to produce a seal with lower loading pressures on the sleeve.

The backup spring wire 46 is preferably rectangular in cross section, as shown, for two reasons. First, this cross section provides the backup rings 32 with generally cylindrical outer surfaces 50 which flatly engage the tube 36 and thereby present maximum resistance to axial extrusion of the material of the expander sleeve 30 between the rings and tube. Secondly, the adjacent ring coils seat flat against one another to present maximum resistance to radial extrusion of the material of the expander sleeve between the coils. In this latter regard, it is obvious that the adjacent backup ring coils are urged axially into pressured contact by the axial compression force exerted on the tube expander assembly 12 during the swaging cycle to inhibit extrusion of the expander sleeve between the coils.

The axially outer ends 46a, 46b of the backup ring wire 46, that is the wire ends adjacent the sizing bushings 24, 26, are preferably tapered, as shown, to provide the backup rings with relatively flat outer end faces which may seat flat against the sizing bushings. This minimizes the possibility of radial extrusion of the material of the expander sleeve 30 between the backup rings and the bushings. It would appear, at first glance, that the inner ends 46b of the backup ring wires should be similarly tapered to provide the rings with flat inner ends for seating flat against the ends of the expander sleeve 30. It has been found in practice, however, that such tapered inner ring wire ends form knife edges which tend to cut or fray the expander sleeve. For this reason, the inner ends of the rings are preferably rounded, as shown.

The backup rings 32 may be constructed of any suitable material. Preferably, however, these rings are constructed of a metal, such as beryllium copper or phosphor bronze, which will not scrape, gall, or otherwise mar or damage the inner surface of the tube 36 as the rings slide within the tube during the swaging cycle. Under high-forming loads, steel spring wire is preferably utilized because of its higher strength. The sharp edges of the spring coils are also preferably broken or rounded slightly for this reason. Additional prevention of tube damage may be achieved by plating the backup rings with silver, gold, tin, or other relatively soft metal, coating the rings with a dry film lubricant, and/or introducing an effective high-pressure lubricant between the expander assembly and the tube.

While the illustrated tube-swaging device employs a drawbolt which extends centrally through the tube expander sleeve 30, the drawbolt may be replaced in some applications by a cup mounting a centering pin.

Reference is now made to FIG. 7 which illustrates a pressure ring assembly 100 according to the invention employed as a fluid seal assembly between a cylinder 102 and the piston head 104 of a plunger 106 movable in the cylinder. In this case, the pressure ring or seal assembly is mounted on and in surrounding relation to the piston head, or piston, as it will be hereinafter referred. The seal assembly 100 is essentially identical to the pressure ring or tube expander assembly described earlier and thus will not be described in detail. Suffice it to say that the seal assembly comprises a resilient pressure or seal ring 108, antiextrusion spring backup rings 110 at the ends of the seal ring, and resilient shoulder extensions 112 at the ends of the seal ring which extend through and are effective to radially deform or expand the backup rings outwardly against the inner wall of the cylinder 102 upon axial compression of the seal assembly.

In the fluid-sealing application under discussion, the shoulder face 114 against which the seal assembly is axially compressed is defined by an annular shoulder 116 on the piston 104. The seal assembly is compressed against the shoulder face 114 by compression means 118 carried on the piston. The illustrated compression means comprise a compression ring 120 which surrounds the piston 104 and seats axially against the adjacent end of the seal assembly 100 and means 122, such as a spring, for urging the compression ring axially against the seal assembly. The distal end of the spring is anchored to the piston by a snap ring 124. The compression spring 122 is selected to exert on the seal assembly 100 a sufficient axial compression force to radially deform the seal ring 108 into effective fluid sealing relation with the cylinder 102 and piston 104 under the particular fluid pressure to which the seal assembly is exposed. Outward deformation or expansion of the backup rings 110 against the inner wall of the cylinder 102, occasioned by axial compression of the seal assembly, prevents extrusion of the seal ring 108 between the cylinder and the piston flange 116 and between the cylinder and the compression ring 120.

While the instant invention has been shown and described herein what is conceived to be the most practical and preferred embodiments, it is recognized that departures may be made therefrom in the scope of the invention, which is therefore not to be limited to the details disclosed herein, but is to be afforded the full scope of the claims.

What is claimed is:

1. An extrusion resistant axially compressible, radially deformable pressure ring assembly for telescoping inner and outer members having confronting radially presented cylindrical surfaces defining an intervening annular clearance space bounded by an annular axially presented shoulder face on one member, said pressure ring assembly comprising:
   a resilient pressure ring body having radially presented inner and outer surfaces;
   an antiextrusion spring backup ring coaxially disposed at one end of said ring body including at least one coil having radially presented inner and outer surfaces and being radially expandable;
   said pressure ring assembly being adapted to be disposed in operative position relative to said telescoping members, wherein said assembly surrounds said inner telescoping member with said backup ring seating axially against said shoulder face on said one telescoping member and said ring body and backup ring having corresponding radially presented surfaces thereof exposed radially of said assembly for contact with said cylindrical surface of said other telescoping member;
   said pressure ring assembly being compressible to compress said ring body axially and thereby deform said body radially in the direction of said exposed surface thereof;
   a resilient axial shoulder extension at said one end of said ring body disposed in axial overlapping relation with said backup ring;
   said body extension being compressed axially and thereby deformed radially against said backup ring to deform said backup ring in said radial direction thereof by axial compression of said pressure ring assembly, whereby said backup ring inhibits extrusion of the material of said ring body into said clearance space between said telescoping members;
   said shoulder extension and the opposing surface of said backup ring being axially tapered to exert a radial wedging action on said backup ring for deforming said backup ring in said radial direction thereof when said ring assembly is axially compressed, whereby said backup ring inhibits extrusion of the material of said ring body into said clearance space between said telescoping members.

2. An extrusion resistant axially compressible, radially deformable pressure ring assembly for telescoping inner and outer members having confronting radially presented cylindrical surfaces defining an intervening annular clearance space bounded by an annular axially presented shoulder face on one member, said pressure ring assembly comprising:
   a resilient pressure ring body having radially presented inner and outer surfaces;
   an antiextrusion spring backup ring coaxially disposed at one end of said ring body and including at least one coil having radially presented inner and outer surfaces and being radially expandable;
   said pressure ring assembly being adapted to be disposed in operative relationship to said telescoping members, wherein said assembly surrounds said inner telescoping member with said backup ring feeding axially against said shoulder face on said one telescoping member and said ring body and backup ring having corresponding radially presented surfaces thereof exposed radially of said assembly for contact with said cylindrical surface of said other member, said exposed surfaces of said ring body and said backup ring comprising the outer radially presented surfaces of said body and said backup ring, respectively, and axial compression of said pressure ring assembly being effective to deform said ring body and backup ring radially outwardly;
   said backup ring deforming means comprising an integral shoulder extension on said end of said ring body extending centrally through said backup ring;
   said body extension being compressed axially and thereby deformed radially outwardly against said backup ring in response to axial compression of said pressure ring assembly;
   said body extension being externally axially tapered and said ring being internally axially tapered to exert an outward radial wedging force on said backup ring when said ring assembly is axially compressed;
   whereby said backup ring inhibits extrusion of the material of said ring body into said clearance space between said telescoping members.

3. An extrusion resistant axially compressible, radially deformable, pressure ring assembly for telescoping inner and outer members having confronting radially presented cylindrical surfaces defining an intervening annular clearance space bounded by an annular axially presented shoulder face on one member, said pressure ring assembly comprising:
   a resilient pressure ring body having radially presented inner and outer surfaces;
   an antiextrusion spring backup ring coaxially disposed at one end of said ring body including at least one coil having radially presented inner and outer surfaces and being radially expandable;
   said pressure ring assembly being adapted to be disposed in operative position relative to said telescoping members, wherein said assembly surrounds said inner telescoping member with said backup ring seating axially against said shoulder face on said one telescoping member and said ring body and backup ring having corresponding radially presented surfaces thereof exposed radially of said assembly for contact with said cylindrical surface of said other telescoping members;
   said pressure ring assembly being axially compressible to compress said ring body axially and thereby deform said body radially in the direction of said exposed surface thereof;
   a resilient axial shoulder at said one end of said ring body and extending axially under said backup ring for deforming said backup ring radially in the direction of said exposed surface thereof in response to axial compression of said pressure ring assembly, said resilient axial shoulder being compressed axially and thereby deformed radially against said backup ring to deform said backup ring in said radial direction thereof by axial compression of said pressure ring assembly,
   said one end of said ring body confronting said backup ring being beveled to minimize the axial compressive stress in said ring body during initial axial compression of said ring assembly to deform said backup ring radially.

4. An extrusion resistant axially compressible, radially deformable pressure ring assembly for telescoping inner and outer members having confronting radially presented cylindrical surfaces defining an intervening annular clearance space bounded by an annular axially presented shoulder face on one member, said inner telescoping member comprising the drawbolt of a tube-swaging device and said outer telescoping member comprising a tube to be swaged outwardly into interlocking engagement with the surrounding coupling part; said pressure ring assembly comprising:
   a tube expander assembly to be mounted in surrounding relation to said bolt;
   a resilient pressure ring body having radially presented inner and outer surfaces, said ring body comprising a resilient tube expander sleeve;

an antiextrusion spring backup ring coaxially disposed at one end of said ring body including at least one coil having radially presented inner and outer surfaces and being radially expandable;

said pressure ring assembly being adapted to be disposed in operative position relative to said telescoping members, wherein said assembly surrounds said inner telescoping member with said backup ring seating axially against said shoulder face on said one tubular member and said ring body and backup ring having corresponding radially presented surfaces exposed radially of said assembly for contact with said cylindrical surface of said other telescoping members;

said exposed surfaces of said ring body and backup ring comprising the outer radially presented surfaces of said expander sleeve and backup ring, respectively;

said pressure ring assembly being axially compressible to compress said ring body axially and thereby deform said body radially in the direction of said exposed surface thereof;

a resilient shoulder at said one end of said ring body and extending axially under said backup ring for deforming said backup ring radially in the direction of said exposed surface thereof in response to axially compression of said pressure ring assembly, said resilient axial shoulder being compressed axially and thereby deformed radially against said backup ring to deform said backup ring in said radial direction thereof by axial direction of said pressure ring assembly, whereby said backup ring inhibits extrusion of the material of said ring body into said clearance space between said telescoping member.

* * * * *